UNITED STATES PATENT OFFICE.

HARRY EAST MILLER, OF OAKLAND, CALIFORNIA.

MOISTURE-PROOFING HYGROSCOPIC POWDER MATERIALS.

987,079. Specification of Letters Patent. Patented Mar. 14, 1911.

No Drawing. Application filed January 10, 1908. Serial No. 410,071.

*To all whom it may concern:*

Be it known that I, HARRY EAST MILLER, a citizen of the United States, residing at Oakland, in the county of Alameda and State of California, have invented certain new and useful Improvements in Moisture-Proofing Hygroscopic Powder Materials, of which the following is a specification.

My invention relates to the treatment of those powder materials which on account of their hygroscopic character, require to be more or less moisture-proofed, to render them available in the art of manufacturing explosives; and, while my invention is applicable to any hygroscopic powder material, whether occurring in nature, as sodium nitrate, or manufactured, as the perchlorates, the persulfates, and ammonium nitrate, its especial application is to such nitrates as are available for powder making, and particularly, nitrate of ammonia.

In the processes heretofore known of preparing nitrate of ammonia for use as an ingredient of powder, the effort has been to render the grains or granules non-hygroscopic by a protective coating. Hitherto, as far as I am aware, in practice, at least, petrolatum has been used for this purpose. This, however, has proved unsatisfactory, in that while it water-proofs, to a greater or less degree, the grains or granules, it leaves them in such a condition that they cake, necessitating a breaking up of the mass, before it can be used as a powder ingredient; and this petrolatum coating is more or less removed when incorporating with other dope ingredients in the dry mixer. Petrolatum is not an active powder ingredient, and its presence is known to lessen the sensitiveness of the powder, and, in some cases, to such a degree as to make the powder worthless.

The object of my invention is to render the hygroscopic powder materials, as for instance, ammonium nitrate, non-hygroscopic by a protective adhering colloid coating in such a manner that not only will the grains or granules be fully water-proofed, but they will not cake together; and the sensitiveness of the resultant powder will not be impaired.

With these ends in view, my invention consists in the novel process hereinafter described of treating the crystallized grains or granules of the dehydrated powder material with a solution or partial solution of an ester of any of the known forms of carbohydrates, in any suitable volatile solvent, which upon evaporation leaves a protecting adhering colloid coating upon the grains or granules.

For the purpose of this specification, and to properly convey my meaning in the use of terms, I will state that I include in and mean by carbohydrates, that large class of bodies, comprising starches, sugars and celluloses; and by this definition I include mannite among the sugars, and oxy-cellulose and hydrocellulose among the celluloses. By "suitable solvent" I mean to include acetone, methyl alcohol, ether-alcohol, amyl acetate, or any other volatile solvent. The ester of carbohydrate may be any ester, but the nitric acid esters are preferred.

In carrying out my invention, using ammonium nitrate for example, the nitrate of ammonia solution made by combining nitric acid and aqua ammonia, in proper proportions, is evaporated in any suitable vessel, and when sufficiently concentrated, is run into a crystallizing pan which has the usual means for heating and stirring, by which, or by any other well known means, it is brought to crystallization. I will say, for example, the ammonium nitrate thus formed amounts to 100 lbs.; or I may take, say 100 lbs. of ammonium nitrate in the first place. The heating is then discontinued, or the pan may be even cooled, but the stirring proceeds. When the mass has assumed a proper temperature, a solution or partial solution of an ester, preferably the nitric acid esters, of a carbohydrate, preferably cellulose, in any suitable volatile solvent, is added while the mass is still being stirred. For example, in making this solution, I take one pound of nitrocellulose and dissolve it in three gallons of acetone. The temperature of the mass, at the time the solution is added varies with the character of the solvent used, but, in any case, it should be somewhat near the boiling point of said solvent. The solution evaporates and coats the grains or granules with an adhering colloid; and the heat of the mass must be sufficient to thoroughly dry the coating, before removing said mass from the pan. For thus coating the grains or granules, the weight of the dry colloid coating may be less than 1% of the finished product.

Having thus described my invention, what I claim as new and desire to secure by Letters Patent is:—

The improved method of protecting crystalline hygroscopic powder materials which consists in first subjecting a solution of the material to heat and stirring so as to crystallize the same; next allowing the mixture to partially cool, while continuing the stirring; and when the proper temperature is reached, which temperature is still high, adding a solution of nitric acid ester of cellulose, the stirring being continued during said mixing; and lastly evaporating the solvent by the heat of said mixture to leave the granules coated with a dry non-hygroscopic covering.

In testimony whereof I have signed my name to this specification in the presence of two subscribing witnesses.

HARRY EAST MILLER.

Witnesses:
WM. F. BOOTH,
D. B. RICHARDS.

Copies of this patent may be obtained for five cents each, by addressing the "Commissioner of Patents, Washington, D. C."